July 12, 1955
W. HARPELL ET AL
2,712,839
WORK HOLDER FOR LATHE
Filed July 25, 1952
2 Sheets-Sheet 1
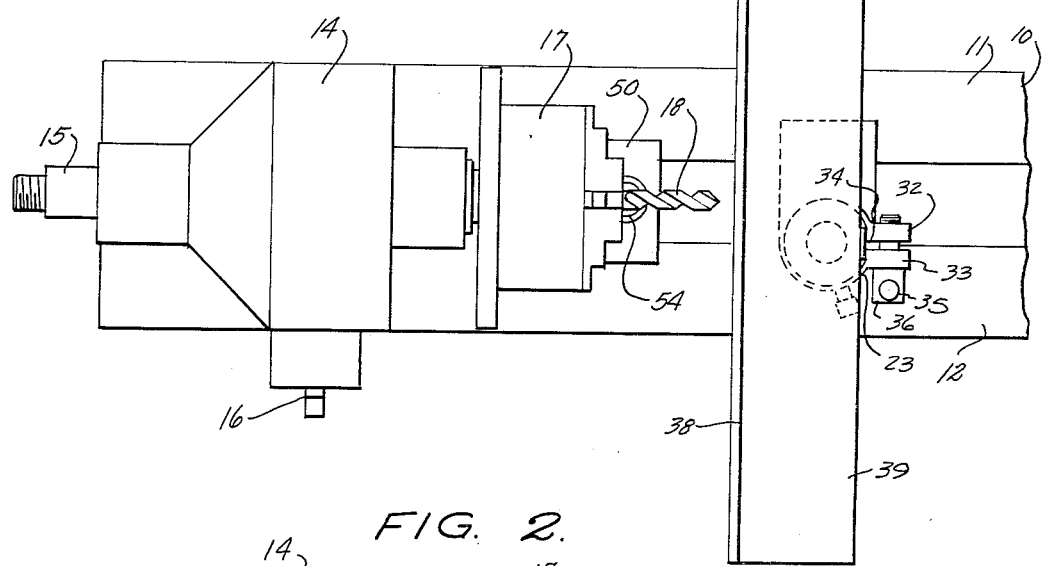
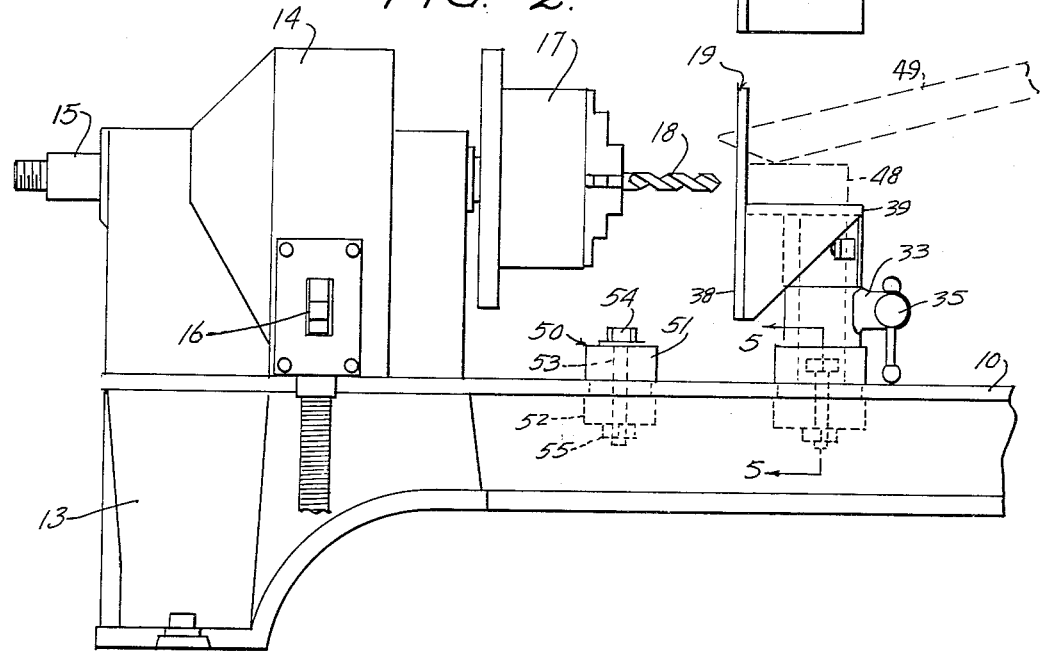
INVENTOR.
WALTER HARPELL,
WILLIAM N. GRAY,
BY
McMorrow, Berman & Davidson
ATTORNEYS.

July 12, 1955     W. HARPELL ET AL     2,712,839
WORK HOLDER FOR LATHE
Filed July 25, 1952     2 Sheets-Sheet 2
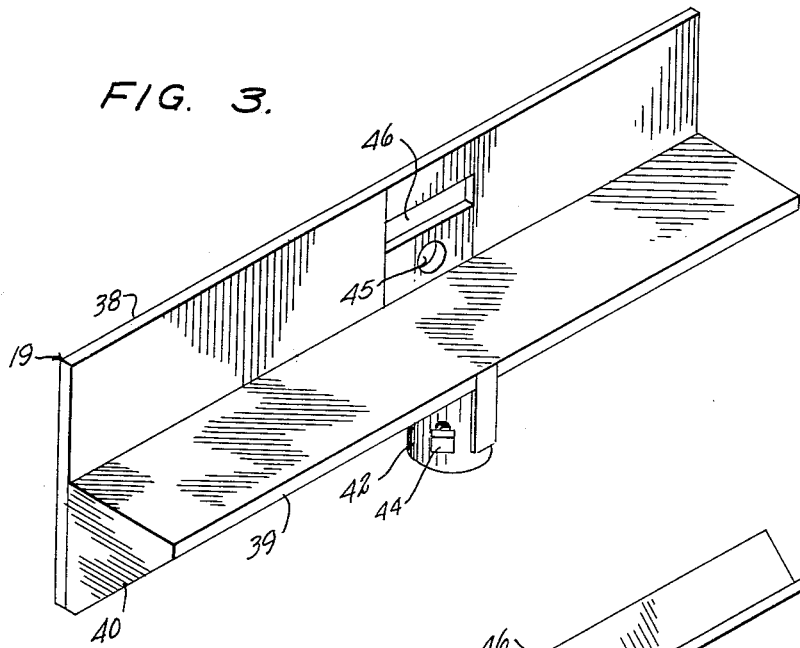
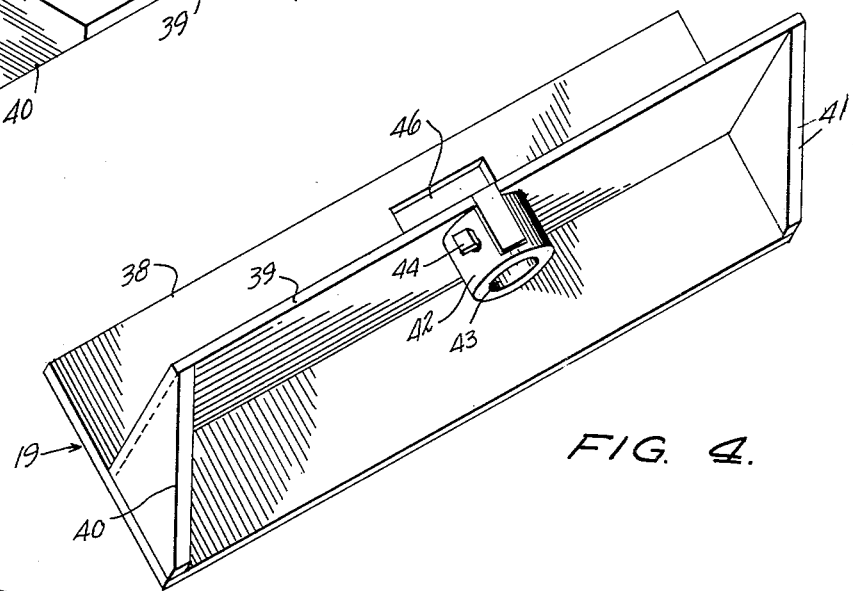
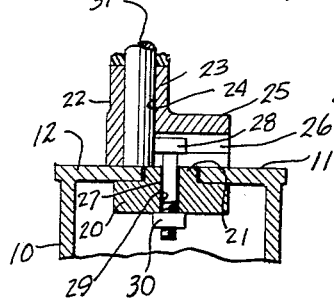
INVENTOR.
WALTER HARPELL,
WILLIAM N. GRAY,
BY
McMorrow, Berman & Davidson
ATTORNEYS.

United States Patent Office 2,712,839
Patented July 12, 1955

2,712,839
WORK HOLDER FOR LATHE
Walter Harpell, Elmont, and William N. Gray, Ridgewood, N. Y.
Application July 25, 1952, Serial No. 300,872
3 Claims. (Cl. 144—92)

This invention relates to auxiliary or accessory work holders for lathes and more particularly to a work holder for adapting a lathe to the operation of boring dowel pin holes in wooden frame members.

It is among the objects of the invention to provide an improved work holder which can be slidably mounted on the bed of a lathe to hold work pieces in proper position for boring or drilling by a bit mounted in a chuck carried by the head stock of the lathe; which is movable with a work piece supported thereon toward and away from an associated bit and holds the work piece in predetermined position relative to the bit for such operations as boring dowel pin holes in wooden frame members; which is adjustable for varying the height and angularity of a work piece relative to an associated bit; which includes stop means mounted on the lathe bed to limit penetration of the bit into the work piece; and which is simple and durable in construction, economical to manufacture, easy to install and use, and positive and effective in operation.

Other objects and advantages of the invention will become apparent from a consideration of the following description and the appended claims in conjunction with the accompanying drawings wherein:

Figure 1 is a top plan view of a fragmentary portion of a lathe showing a work holder illustrative of the invention operatively mounted on the lathe;

Figure 2 is a side elevational view of the fragmentary lathe portion and work holder illustrated in Figure 1;

Figure 3 is a perspective view of the work supporting portion of the work holder with the work holder portion in upright position;

Figure 4 is a perspective view of the work holder portion illustrated in Figure 3 with the work holder portion partly inverted; and Figure 5 is a fragmentary cross sectional view on the line 5—5 of Figure 2.

With continued reference to the drawings, the lathe comprises a bed 10 providing spaced apart and substantially parallel flat guideways 11 and 12 having their upper surfaces disposed substantially in a common plane and having their inner or adjacent edges under cut, as illustrated in Figure 5. The lathe bed 10 is supported on lathe frame legs, as indicated at 13, and a housing 14 extends upwardly from the lathe bed at one end of the latter. A head stock 15 is journaled in the housing 14 and disposed above the lathe bed with its axis extending longitudinally of the lathe bed and substantially parallel to the horizontal upper surface of the bed and this head stock is driven by suitable power means, such as an electric motor mounted in the housing 14 and drivingly connected to the head stock 15, the motor being controlled by a manually operated switch 16 mounted on the housing. An adjustable chuck 17 is mounted on the head stock or lathe spindle 15 at the end of the housing 14 adjacent the lathe bed 10 and a bit 18 is mounted in the chuck 17 and projects therefrom in a direction away from the housing 14 with its rotational axis coincident with the rotational axis of the head stock or spindle 15.

The bit 18 may be a drill bit, as illustrated, or may be a wood boring bit or auger, depending upon the material of the work piece operated upon and, as lathes of the character indicated are old and well known to the art, and as the specific features of the lathe constitute no part of the present invention, except in the combination thereof with the work holder and holder stop of the invention, a more detailed illustration and description of the lathe is considered unnecessary for the purposes of the present invention.

The work holder of the present invention comprises a slide block 20 of rectangular shape disposed below the ways 11 and 12 of the lathe bed and having on one side a longitudinally extending ridge 21 disposed between the inner or adjacent edges of the ways, the guide block overlapping the under surfaces of the ways at the opposite sides of the space between the ways and the ridge 21 having a flat outer or upper surface in the plane of the flat upper surfaces of the ways 11 and 12 of the lathe bed, a carrier 22 mounted on the ways 11 and 12 and secured to the slide block 20 and a work supporting table, generally indicated at 19, mounted on the carrier 22.

The carrier includes a boss or sleeve portion 23 of substantially cylindrical shape having a cylindrical bore 24 extending longitudinally therethrough with its center line perpendicular to the plane of the upper surface of the lathe bed, and a lateral extension 25 having an under cut groove 26 of T cross sectional shape extending therethrough from the outer end of the extension to the bore 24 and opening to the end of the carrier adjacent the lathe bed 10. A bolt 27 has its head 28 received in the under cut or widened portion of the groove 26 and its shank extending downwardly out of the groove 26 and through an aperture 29 in the slide block 20. The end of the bolt remote from the head 28 is screw threaded and a nut 30 is threaded onto the screw threaded end of the bolt and bears against the under side of the slide block 20 to rigidly secure the carrier 22 to the slide block. The upper surface of the ridge 21 on the slide block engages the bottom surface of the carrier 22, however, before the ways 11 and 12 of the lathe bed are frictionally clamped between the carrier and the slide block, so that the carrier and slide block assembly can be moved freely longitudinally of the lathe bed, but will be held against turning or tilting movements relative to the lathe bed.

A stem 31 of cylindrical shape extends through and closely fits the bore 24 of the sleeve formation 23 and projects from the end of the sleeve formation 23 remote from the lathe bed. The upper portion of the sleeve formation 23 is split and provided with laterally projecting, apertured lugs 32 and 33 disposed at respectively opposite sides of the split 34 in the sleeve formations and a clamp screw 35 extends through the apertures in the lugs 32 and 33. The clamp screw has a head 36 on one end bearing against the outer side of the lug 33 and is screw threaded at its other end and the aperture in the lug 32 is screw threaded for engagement with the screw threaded portion of the clamp screw, so that the clamp screw is effective to pull the lugs 32 and 33 together and clamp the sleeve formation 23 of the carrier firmly about the stem 31 to hold the stem in selected positions of angular and longitudinal adjustment relative to the carrier. The work supporting table 19 comprises two flat plates 38 and 39 of elongated, rectangular shape secured together in a manner such that the plate 39 has one longitudinal edge thereof extending along the mid-width location of one face of the plate 38 and projects perpendicularly from the face of the plate 38 along which it extends. The plates 38 and 39 are of the same length and the plate 39 is rigidly held in its perpendicular relationship to the plate 38 by braces or gussets 40 and 41 of triangular shape disposed one at each end of the structure provided by the plates 38 and 39 and each having one edge extending along and secured to the adjacent side of the plate 39 at the corresponding end of this plate and its other edge extending along and secured to the plate 38 at the corresponding end of this plate and at the side thereof adjacent the plate 39, the gussets being of right angle triangular shape and having their hypotenuse edges extending from corresponding corners of the plate 39 remote from the plate 38 to corners of the plate 38 at the same side of the plate 39. When the table is operatively mounted on the lathe the gussets 40 and 41 are disposed at the under side of the plate 38 nearest the bed of the lathe.

A tubular sleeve or bushing 42 of cylindrical shape is secured at one end to the plate 39 at the mid-length location of this plate and at the side of the plate 39 at which the gussets 40 and 41 are disposed. This sleeve 42 has a bore 43 extending therethrough, the center line of which is perpendicular to the faces of the plate 39 and which receives the portion of the stem 31 extending above the sleeve formation 23 of the carrier 22.

The sleeve 42 is provided with a tapped hole extending through the wall thereof and a set screw 44 is threaded through this tapped hole and engages the stem 31 to lock the sleeve or bushing 42 firmly on the stem with the plate 39 disposed parallel to the upper surface of the lathe bed 10 and the plate 38 disposed perpendicular to the upper surface of the lathe bed and extending transversely thereacross.

The entire work holder is movable along the lathe bed toward and away from the lathe chuck 17 and the bit 18 carried thereby and the plate 39 is disposed at the side of the plate 38 remote from the lathe chuck and is effective to support a work piece in horizontal position above the lathe bed. The work piece engages the face of the plate 38 remote from the chuck and this plate holds the work piece in selected positions of angular adjustment relative to the rotational axis of the lathe head stock or spindle and the bit 18.

The plate 38 is provided with a hole 45 slightly spaced from the surface of the plate 39 remote from the lathe bed and is provided at a location spaced from the hole 45 in a direction away from the plate 39 with a longitudinally extending slot 46 of elongated, rectangular shape. The hole 45 is in alignment with the bit 18 and is of sufficient size to receive the largest size bit to be used in combition with the work holder with the plate 38 disposed at various positions of angular adjustment relative to the rotational axis of the bit.

When boring dowel pin holes in wooden frame members, the diameter of the bit used will ordinarily be selected in accordance with the thickness of the work piece and, as a bit of smaller diameter will be used for a thinner work piece, this will permit raising the table 19 sufficiently to bring the rotational axis of the bit into coincidence with the mid-thickness plane of the work piece supported on the plate 39. For thicker work pieces and larger bits the table is lowered sufficiently to maintain the rotational axis of the bit in coincidence with the medial plane of the thickness of the work piece regardless of the thickness of the work piece, within practical limits.

In using the device, with a work piece, as indicated at 48 in Figure 2, supported on the upper surface of the plate 39 and bearing against the surface of the plate 38 adjacent the plate 39, one end of a lever 49 may be inserted through the slot 46 in the plate 38 with the lever extending from the plate 38 in a direction away from the lathe chuck 17, and downward pressure may be applied to the end of the lever remote from the plate 38 to hold the work piece firmly on the plate 39.

A stop, generally indicated at 50, is mounted on the lathe bed 10 between the work support 19 and the head stock housing 14 of the lathe. This stop comprises a rectangular block 51 disposed upon and extending transversely of the ways 11 and 12 and across the space between the inner edges of the ways and provided intermediate its length with an aperture extending therethrough, a slide block 52 disposed below the ways 11 and 12 and having an aperture therethrough registering with the aperture in the block 51, and a bolt 53 extending through the apertures in the block 51 and the slide block 52 with a head 54 bearing on the upper surface of the block 51 and a nut 55 threaded onto the lower end thereof and bearing against the under surface of the slide block 52.

The stop 50 can be moved longitudinally of the lathe bed toward and away from the head stock housing 14 and securely locked in adjusted position longitudinally of the lathe bed. When the holder 19 is moved in a direction toward the head stock housing 14 the lower portion of the carrier 22 comes into engagement with the block 51 of the stop and this limits movement of the work holder toward the head stock housing and consequently limits penetration of the bit 18 into a work piece 48 supported on the work holder 19. Obviously, the penetration of the bit into the work piece can be regulated by adjusting the position of the stop 50 toward or away from the head stock end of the lathe bed 10.

With the work holder, as described above, a lathe can be used for boring holes, such as dowel pin holes, in work pieces with the holes accurately positioned in the work pieces, and it is not necessary to possess and maintain a drill press for this operation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a lathe having an elongated bed, a head stock supported above said bed at one end thereof for rotation about an axis extending longitudinally of the bed and parallel thereto, a chuck mounted on said head stock, and a bit mounted at one end in said chuck and projecting therefrom, a carrier mounted on said bed for free sliding movement toward and away from said chuck, a work holder mounted on said carrier for angular movement about an axis perpendicular to the rotational axis of said head stock, means on said carrier releasably locking said work holder in selected positions of angular adjustment about the axis of angular movement of said work holder and relative to the rotational axis of said head stock, and a stop mounted on said bed between said head stock and said carrier for sliding movements longitudinally of said bed and including means for releasably locking the stop to the bed at selected distances from said chuck said work holder comprising a first plate disposed above said bed, a stem projecting from said first plate toward said lathe bed and received in said carrier, and a second plate attached to said first plate at an angle thereto, said second plate having an opening therein through which the rotational axis of the head stock passes.

2. In combination with a lathe having an elongated bed, a head stock supported above said bed at one end thereof for rotation about an axis extending longitudinally of the bed and parallel thereto, a chuck mounted on said head stock, and a bit mounted at one end in said chuck and projecting therefrom, a carrier mounted on said bed for free sliding movement toward and away from said chuck, a work holder mounted on said carrier for angular movement about an axis perpendicular to the rotational axis of said head stock, means on said carrier releasably locking said work holder in selected positions of angular adjustment about the axis of angular movement of said work holder and relative to the rotational axis of said head stock, and a stop mounted on said bed between said head stock and said carrier for sliding movements longitudinally of said bed and including means for releasably locking the stop to the bed at selected distances from said chuck, said work holder comprising a first plate of elongated rectangular shape disposed above and parallel to said bed, a stem projecting perpendicularly from said first plate toward said lathe bed intermediate the length of said first plate and received in said carrier, and a second plate of elongated rectangular shape disposed above and perpendicular to said bed and attached to said first plate along a longitudinal edge thereof, said second plate having an opening therein through which the rotational axis of said head stock passes when said work holder is disposed transversely of the lathe bed.

3. In combination with a lathe having an elongated bed, a head stock supported above said bed at one end thereof for rotation about an axis extending longitudinally of and parallel to said bed, a chuck mounted on said head stock, and a bit mounted at one end in said chuck and projecting therefrom, a carrier mounted on said bed for free sliding movements toward and away from said chuck, a work holder mounted on said carrier for movements of adjustment toward and away from lathe bed and for angular movement about an axis perpendicular to the rotational axis of said head stock, and a stop mounted on said bed between said head stock and said carrier for sliding movements longitudinally of said bed and including means for releasably locking the stop to the bed at selected distances from said chuck, said work holder comprising a first plate of elongated rectangular shape disposed above and parallel to said bed, a stem projecting perpendicularly from said first plate toward said lathe bed intermediate the length of said first plate and received in said carrier, and a second plate of elongated rectangular shape disposed above and perpendicular to said bed and attached to said first plate along a longitudinal edge thereof, said second plate having an opening therein through which the rotational axis of said head stock passes when said work holder is disposed transversely of said bed and said carrier including a clamp sleeve receiving said stem and clamping said stem at selected positions of spatial adjustment of said work holder relative to said lathe bed and at selected positions of angular adjustment of said work holder relative to the rotational axis of said head stock.

References Cited in the file of this patent
UNITED STATES PATENTS

| | | |
|---|---|---|
| 104,476 | Martin et al. | June 21, 1870 |
| 291,971 | Atwood | Jan. 15, 1884 |
| 481,737 | Scheidt | Aug. 30, 1892 |
| 1,219,078 | Calahan | Mar. 13, 1917 |
| 1,472,927 | McLain | Nov. 6, 1923 |
| 1,667,022 | Wood | Apr. 24, 1928 |
| 1,982,025 | Russell | Nov. 27, 1934 |